United States Patent [19]

Hicks

[11] Patent Number: 4,836,234
[45] Date of Patent: Jun. 6, 1989

[54] ELECTRICALLY OPERATED FLUID CONTROL VALVE

[76] Inventor: Weldon R. Hicks, 12630 Marble Dr., Houston, Tex. 77070

[21] Appl. No.: 134,988

[22] Filed: Dec. 18, 1987

[51] Int. Cl.$^4$ .............................................. G05D 16/00
[52] U.S. Cl. .......................... 137/596.17; 137/596.1; 137/613
[58] Field of Search ................. 137/596.17, 596.1, 613

[56] References Cited

U.S. PATENT DOCUMENTS

| | | | |
|---|---|---|---|
| 3,242,945 | 3/1966 | Nash | 137/596.17 |
| 3,994,314 | 11/1976 | Hartley | 137/596.17 |
| 4,131,130 | 12/1978 | Ruby | 137/596.17 |
| 4,182,368 | 1/1980 | Hartley | 137/596.1 X |
| 4,527,590 | 7/1985 | Kolze | 137/596.17 |
| 4,535,810 | 8/1985 | Duder et al. | 137/596.17 |

*Primary Examiner*—Arnold Rosenthal
*Attorney, Agent, or Firm*—Kenneth A. Roddy

[57] ABSTRACT

An electrically operated fluid control valve provides a controlled output pressure proportional to an electrical control signal. The valve housing has a pressure control chamber, an inlet passageway leading from an inlet port to the chamber, an outlet port connected to the chamber, and an outlet passageway leading from the chamber to an exhaust port. A supply diaphragm coupled with a supply valve at the inlet port regulates fluid pressure supplied to the chamber through the inlet passageway and another passageway communicates fluid pressure from the chamber to the supply diaphragm. An exhaust diaphragm at one end of the chamber coupled with an exhaust valve at the exhaust port regulates fluid pressure supplied to the exhaust port and the outlet passageway communicates fluid pressure between the chamber and the exhaust diaphragm. A torque motor in the housing rotates a control arm in the chamber to move an adjustable inlet control/relief valve in the inlet passageway to control the flow of fluid pressure between the inlet passageway and the control chamber or an adjustable outlet control/relief valve in the outlet passageway to control the flow of fluid pressure between the outlet passageway and the control chamber. The inlet control/relief valve and the outlet control/relief valve are moved proportional to the applied current and meter the flow of regulated pressure into the control chamber and the outlet port to provide a controlled output pressure through the outlet port and protect the diaphragms from excess differential pressure.

18 Claims, 3 Drawing Sheets

ELECTRICALLY OPERATED FLUID CONTROL VALVE

BACKGROUND OF THE INVENTION

1. FIELD OF THE INVENTION

This invention relates generally to control valves and more particularly to an electrically operated fluid control valve having a torque motor for synchronized control of inlet and outlet valve members to provide a controlled output pressure while protecting sensitive diaphragms from excess differential pressure.

2. BRIEF DESCRIPTION OF THE PRIOR ART

Control valves are known in the art. There are several patents which disclose various control valves.

Duder et al, U.S. Pat. No. 4,535,810 discloses an electrically controlled valve using a piezio electric strip as an actuator which when actuated by an electric signal moves with respect to openings in the pressure and return chambers to cause an increase or decrease in pressure in the respective load passages in communication with the chambers.

Kolze, U.S. Pat. No. 4,527,590 discloses an A.C. solenoid operated valve having a single inlet and dual outlets with lever means pivotally disposed in a valving chamber and having poppets which alternately open and close one outlet while the other remains open upon movement of the lever. An external solenoid coil moves an armature disposed in the chamber which effects the lever movement.

Ruby, U.S. Pat. No. 4,131,130 discloses a pneumatic control valve of the flapper type which controls pressure within a chamber from two sources of pressure in proportion to an electrical control signal. A flapper is associated with a nozzle connected with each source and the flappers are resiliently coupled to a common electrically actuated armature.

Nash, U.S. Pat. No. 3,242,945 discloses a change-over valve comprising a pair of valve chambers each having inlet and outlet ports and an exhaust opening. The co-joined valve bodies are moved so that they alternately seal off the inlet port and exhaust opening of their respective chambers.

Hartley, U.S. Pat. No. 3,994,314 discloses a servo pressure regulator comprising a regulated pressure chamber and first and second ports leading thereto. The first and second ports are adapted to communicate with fluid at first and second pressures, respectively. The valves are folded resilient strips held against the passages or conduits. A first valve controls fluid flow between the first port and the regulated pressure chamber, and a second valve controls fluid flow between the second port and the regulated pressure chamber. The valve associated with the vacuum port is held against the port by the differential pressure, and the valve associated with the pressure port is urged away from the pressure port. A preregulator controls the pressure in the first port to maintain the pressure drop across the first valve no greater than about the first magnitude.

The present invention is distinguished over the prior art in general, and these patents in particular by an electrically operated fluid control valve which provides a controlled output pressure proportional to an electrical control signal. The valve housing has a pressure control chamber, an inlet passageway leading from an inlet port to the chamber, an outlet port connected to the chamber, and an outlet passageway leading from the chamber to an exhaust port. A supply diaphragm coupled with a supply valve at the inlet port regulates fluid pressure supplied to the chamber through the inlet passageway and another passageway communicates fluid pressure from the chamber to the supply diaphragm. An exhaust diaphragm at one end of the chamber coupled with an exhaust valve at the exhaust port regulates fluid pressure supplied to the exhaust port and the outlet passageway communicates fluid pressure between the chamber and the exhaust diaphragm. A torque motor in the housing rotates a control arm in the chamber to move an adjustable inlet control/relief valve in the inlet passageway to control the flow of fluid pressure between the inlet passageway and the control chamber or an adjustable outlet control/relief valve in the outlet passageway to control the flow of fluid pressure between the outlet passageway and the control chamber. The inlet control/relief valve and the outlet control/relief valve are moved proportional to the applied current and meter the flow of regulated pressure into the control chamber and the outlet port to provide a controlled output pressure through the outlet port and protect the diaphragms from excess differential pressure.

SUMMARY OF THE INVENTION

It is therefore an object of the present invention to provide a fluid control valve having an electrically controlled torque motor for synchronized control of the inlet and outlet valve members.

It is another object of this invention to provide an electrically operated fluid control valve to control down stream pressure flow of fluids.

Another object of this invention to provide an electrically operated fluid control valve to control down stream pressure flow of fluids.

Another object of this invention to provide an electrically operated fluid control valve to control up stream pressure flow of fluids.

Another object of this invention is to provide an electrically operated fluid control valve to control the inlet and outlet fluids for fill-dump operations in a closed container.

Another object of this invention is to provide an electrically operated fluid control valve to increase, maintain, or decrease fluid pressure into a closed container.

Another object of this invention is to provide an electrically operated fluid control valve utilizing an open or closed loop circuit for the for synchronized control of fluid pressure.

Another object of this invention is to provide an electrically operated fluid control valve suitable for use with explosive or non-explosive fluids.

A further object of this invention is to provide an electrically operated fluid control valve having relief valves to protect sensitive diaphragms from excess differential pressure and prevent surges when pressure is increased, decreased or reversed.

A still further object of this invention is to provide an electrically operated fluid control valve which is simple in construction, economical to manufacture, and reliable in use.

Other objects of the invention will become apparent from time to time throughout the specification and claims as hereinafter related.

DESCRIPTION OF THE PREFERRED EMBODIMENT

Figure 1:
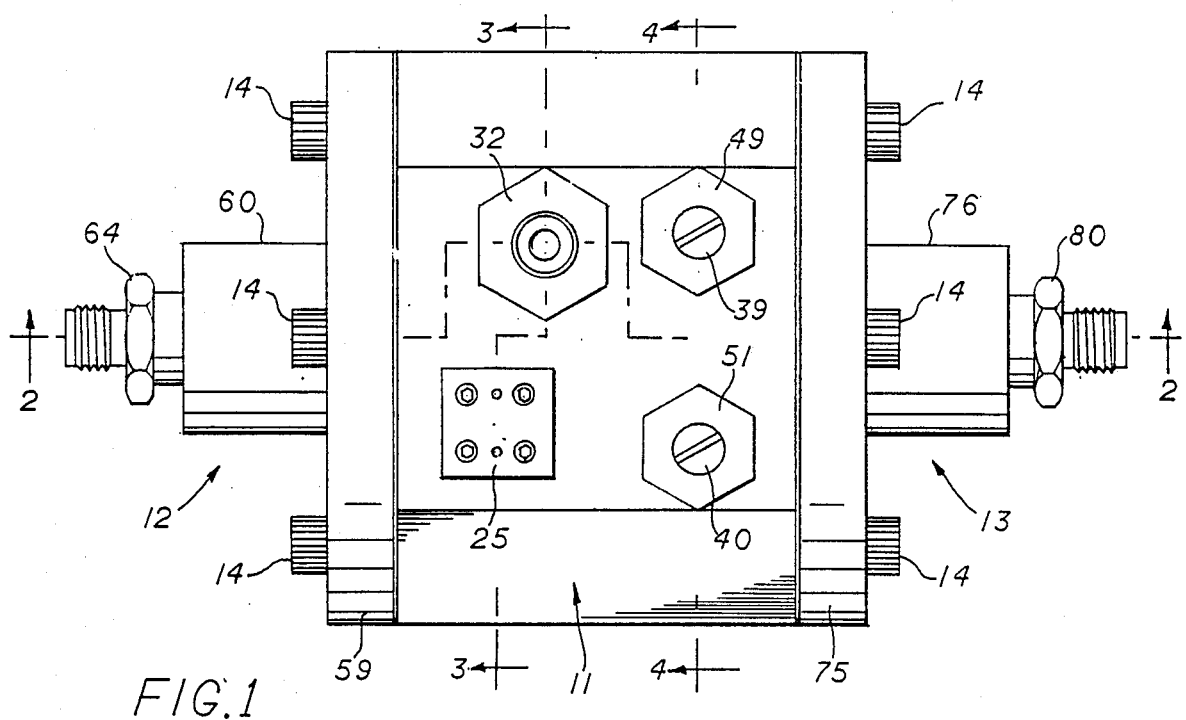
FIG. 1 is a top plan view of the electrically operated fluid control valve in accordance with the present invention.

Referring to the drawings by numerals of reference, there is shown in FIGS. 1, 2, 3, and 4, a preferred electrically operated fluid control valve 10. The valve 10 includes a control housing 11 having a flange-like supply housing 12 releasably connected at one end and a flange-like exhaust housing 13 releasably secured at the opposite end by conventional fasteners such as cap screws 14.

The control housing 11 is a generally rectangular member having a bore 15 extending inwardly from one end and another bore 16 extending inwardly from the opposite end. A cavity, or control chamber 17 extends inwardly a distance from the bore 15 to form a shoulder 18 therebetween and a bore 19 extends inwardly a distance from the bore 16 to form a shoulder 20 therebetween.

Figure 2:
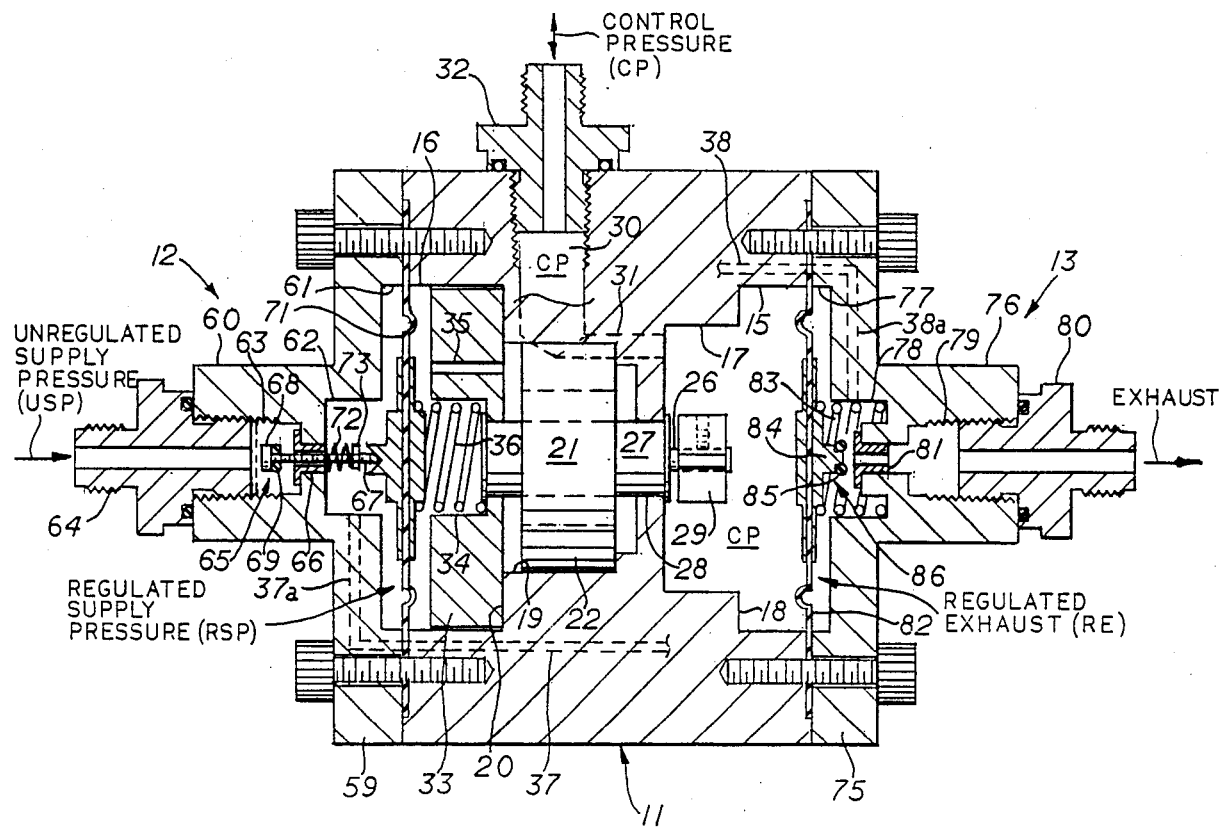
FIG. 2 is a longitudinal cross section of the electrically operated fluid control valve of FIG. 1 taken along lines 2—2 of FIG. 1.
Figure 3:
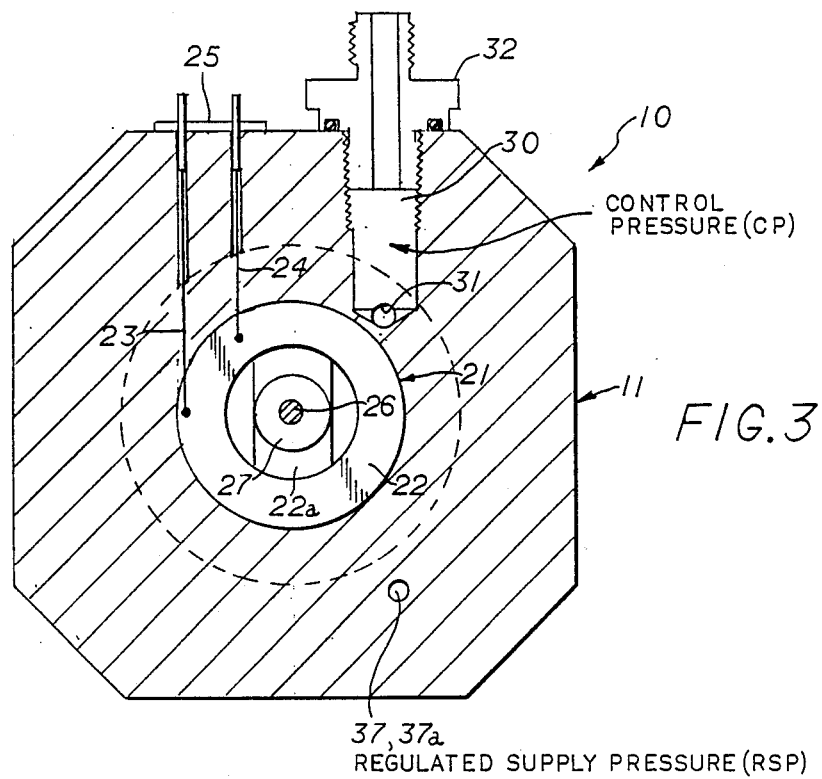
FIG. 3 is a transverse cross section of the valve taken along lines 3—3 of FIG. 1 showing the electrical connection and control pressure port details.

As best seen in FIGS. 2 and 3, a brushless D.C. torque motor 21 is mounted in the bore 19. The stator 22 of the motor 21 is coupled by leads 23 and 24 to an electrical connector 25 on the control housing exterior for providing D.C. voltage to the motor. The motor 21 has an output shaft 26 journaled in a bushing 27 which projects into the control chamber 17 through an opening 28 between the control chamber 17 and bore 19. The torque motor 21 rotates the output shaft 26 clockwise or counter-clockwise about its longitudinal axis in accordance with the polarity and voltage received via the electrical connector 25 from a source of D.C. current (not shown). A generally rectangular control arm 29 is secured on the output shaft 26 to be rotated thereby and extends laterally to each side thereof within the control chamber 17.

A control pressure port 30 extends inwardly a distance from the exterior of the control housing 11, and a passageway 31 extends from the control chamber 17 to the control pressure port 30 for communication therebetween. Control pressure port 30 is provided with internal threads to receive a threaded fitting 32.

A cylindrical spring retainer disc 33 is received within the bore 16 and has a bore 34 extending inwardly from one face and a small passageway 35 extending therethrough to establish communication through the disc 33. A compression spring 36 is received in the bore 34.

As explained in detail hereinafter, a small passageway 37 spaced radially outward from the bore 16 extends inwardly from one end of the housing 11 in communication with the control chamber 17 through an inlet control/relief valve 41. Another small passageway 38 spaced radially from the bore 15 extends from the other end of the housing 11 and is also in communication with the control chamber 17 through an outlet control/relief valve 50.

Figure 4:
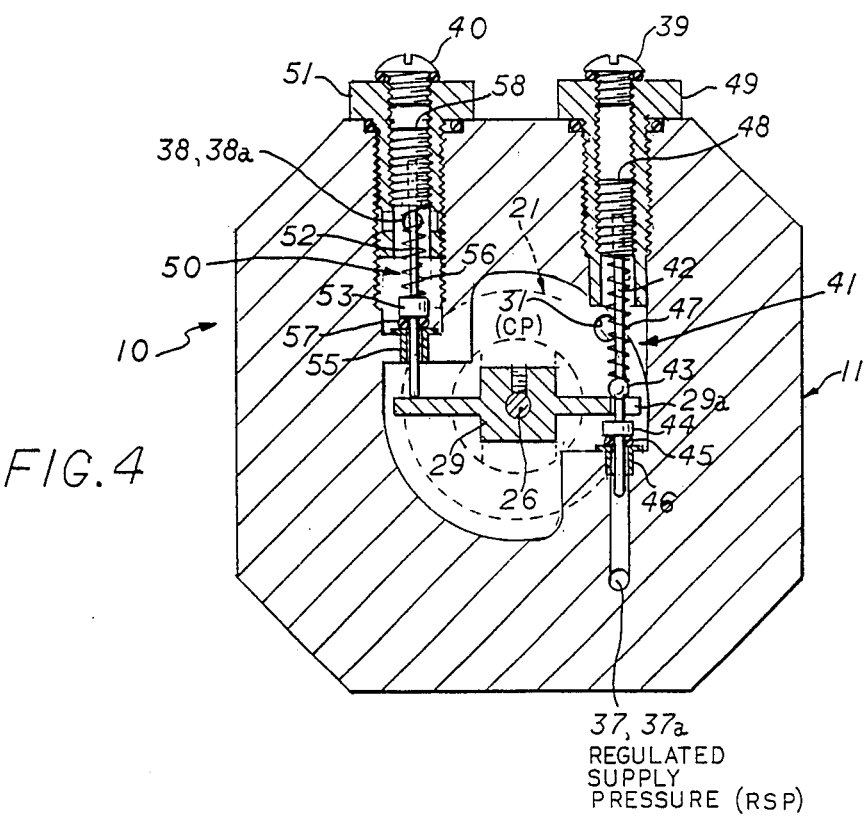
FIG. 4 is a transverse cross section of the valve taken along lines 4—4 of FIG. 1 showing the control arm and inlet and outlet control/relief valve details.

As best seen in FIG. 4, the inlet control/relief valve 41 is movably mounted through a slot 29a at one end of the control arm 29. The inlet control/relief valve 41 comprises a small shaft 42 having a bulbous protrusion 43 near one end which rides on the top surface of the control arm 29 and an enlarged diameter portion 44 spaced therefrom and beneath the control arm. An O-ring 45 is installed on the underside of the enlarged diameter portion 44 to form a sealing relation with a valve seat 46 in the passageway 37. The lower end of the shaft 42 serves as a guide slidably received within the valve seat 46 and the upper end of the shaft is surrounded by a small compression spring 47. The compression spring 47 has one end registered on the bulbous protrusion 43 and the other end engaging the undersurface of an adjustment screw 48 which is adjustably mounted in a threaded fitting 49.

The outlet control/relief valve 50 is slidably mounted in a threaded fitting 51 above the other end of the control arm 29. The outlet control/relief valve 50 comprises a small shaft 52 having an enlarged diameter portion 53 intermediate its ends. The lower end of the shaft 52 serves as a guide and is slidably received through a valve seat 55 and the upper end of the shaft is surrounded by a small compression spring 56. The bottom end of the shaft 52 rides on the top surface of the control arm 29. An O-ring 57 is installed on the underside of the enlarged diameter portion 53 to form a sealing relation with the valve seat 55. The compression spring 56 has one end registered on the enlarged diameter 53 and the other end engaging the undersurface of an adjustment screw 58 which is adjustably mounted in the threaded fitting 51. It should be noted that the adjustment screws 48 and 58 are accessible by removing seal screws 39 and 40 and adjustable from the housing exterior and the control/relief valves 41 and 50 may be adjusted during operation of the control valve 10.

The supply housing 12 has a cylindrical flange 59 and a reduced diameter portion 60 extending outwardly therefrom. A shallow bore 61 substantially the same diameter as the bore 16 extends inwardly from the flanged end and a smaller diameter bore 62 extends inwardly a distance from the bore 61. An inlet port 63 extends inwardly from the reduced diameter portion 60 and is internally threaded to receive a threaded fitting 64. If desired, a wire screen filter (represented by dotted line) may be installed in the supply inlet port 63 beneath the threaded fitting 64.

An inlet supply valve 65 is slidably mounted in a valve seat 66 installed between the inlet port 63 and the bore 62. The inlet supply valve 65 comprises a small shaft 67 having a enlarged diameter portion 68 at one end and an O-ring 69 installed on the shaft beneath the enlarged diameter to form a sealing relation with the valve seat 66. The inward end of the shaft 67 rides on a supply diaphragm 71 and small compression spring 72 is retained on the shaft 67 by a nut 73. The compression spring 72 has one end engaged on the nut 73 and the other end engaging the undersurface of the valve seat 66 to urge the inlet supply valve 65 closed.

The supply diaphragm 71 is clamped between the adjacent surfaces of the control housing 11 and supply housing 12 and separates the bores 61 and 16. The compression spring 36 has one end registered on the supply diaphragm 71 and the other end on the bottom of the bore 34 in disc 33. A passageway 37a in axial alignment with the passageway 37 extends from the bore 62 through the diaphragm 71 to the inlet control/relief valve 41 to establish communication between the inlet supply valve 65 and the control/relief valve 41. The diaphragm 71 serves as a seal between the bores 37 and 37a, and an O-ring (not shown) may be installed at the juncture of the bores.

The exhaust housing 13 has a cylindrical flange 75 and a reduced diameter portion 76 extending outwardly therefrom. A shallow bore 77 substantially the same diameter as the bore 15 extends inwardly from the flanged end and a smaller diameter bore 78 extends inwardly a distance from the bore 76. An exhaust port 79 extends inwardly from the reduced diameter portion 76 and is internally threaded to receive a threaded fitting 80. A valve seat 81 is installed between the exhaust port 79 and the bore 78.

An exhaust diaphragm 82 is clamped between the adjacent surfaces of the control housing 11 and exhaust housing 13 and separates the bores 15 and 77. A passageway 38a in axial alignment with the passageway 38 extends from the bore 78 to the outlet control/relief valve 50 to establish communication between the exhaust port 79 and the outlet control/relief valve 50. The exhaust diaphragm 82 is provided with small extension 84 on the outward side and an O-ring 85 is mounted at the end of the extension to serve as the exhaust valve 86 which forms a sealing relation with the valve seat 81. A compression spring 83 is received in the bore 78 and has one end registered on the exhaust diaphragm 82 and the other end on the bottom of bore 78.

Having described the components of the preferred electrically operated fluid control valve 10, a further discussion of the relationship between the components follows.

As shown in FIG. 2, with the control valve 10 in a neutral state with no supply pressure connected, inlet supply valve 65 is held open due to the force of spring 36 on supply diaphragm 71. Exhaust valve 86 is held open due to the force of spring 83. As seen in FIG. 4, the inlet control/relief valve 41 is normally closed due to spring 47 and outlet control/relief valve 50 is normally closed due to spring 56, when no voltage is applied to the electrical connector 25.

When an unregulated supply pressure USP is connected to inlet port 63, the USP passes through inlet supply valve 65 into passageways 37, 37a to inlet control/relief valve 41 which is closed thereby causing pressure to increase on supply diaphragm 71 and cancel the force of compression spring 36 and thus closing supply valve 65. The pressure in passageways 37, 37a, thus becomes a regulated supply pressure RSP to the inlet control/relief valve 41. Control arm 29 attached to the rotor 22a of the limited rotation brushless D.C. motor 23 provides operation of inlet control/relief valve 41 (FIGS. 3 and 4). When the proper polarity voltage is connected to electrical connector 25, the control arm 29 will rotate counter-clockwise to pull open inlet control/relief valve 41.

When reverse polarity voltage is applied, the control arm 29 will rotate clockwise to push open outlet control/relief valve 50. Pressure within the control chamber 17 between inlet control/relief valve 41 and outlet control/relief valve 50 is control pressure CP supplied through passageway 31 for various usages via control pressure port 30. Control pressure CP is supplied to the inward sides of both exhaust diaphragm 82 and supply diaphragm 71 through passageway 35 (FIG. 2).

Passageways 38, 38a provide exhaust of control pressure CP through outlet control/relief valve 50 as regulated exhaust RE into exhaust housing 13 and the outward side of exhaust diaphragm 82. The regulated exhaust may exit the housing through exhaust port 79. Inlet control/relief valve 41 and outlet control/relief valve 50 are dual purpose, acting as relief valves to eliminate excess differential pressure across either the supply diaphragm 71 or the exhaust diaphragm 82.

Adjusting screw 48 allows selective setting of the force of spring 47 of the inlet control/relief valve 41 to also act as a relief valve. Adjusting screw 58 allows selective setting of the force of spring 56 of the outlet control/relief valve 50 to also act as a relief valve. The relief valve operation will be explained in detail hereinafter.

Compression springs 36 and 83 provide the differential pressure across diaphragms 71 and 82. The springs 36 and 83 may be the same strength for like flow rates or of different strengths to provide different rates between the in and out pressure at the same applied voltage.

The torque motor 21 has no electrical contact brushes between the stator 22 and rotor 22a thus no electrical sparking occurs allowing the control valve 10 to be used with explosive fluids as well as non-explosive fluids. The orifices, restrictions, and/or passageways of the control valve 10 are such size to reduce the chances of becoming clogged.

OPERATION

Having thus described the major components of the electrically operated fluid control valve, the following discussion will describe several different ways in which the valve may be connected to be used for various purposes. For ease of understanding, in FIGS. 5–8 the control arm 29 of motor 23 and the valves 41 and 50 are shown rotated 90° so that the relationship of all components and the flow paths and pressures acting thereon may be seen in a single view.

Figure 5:
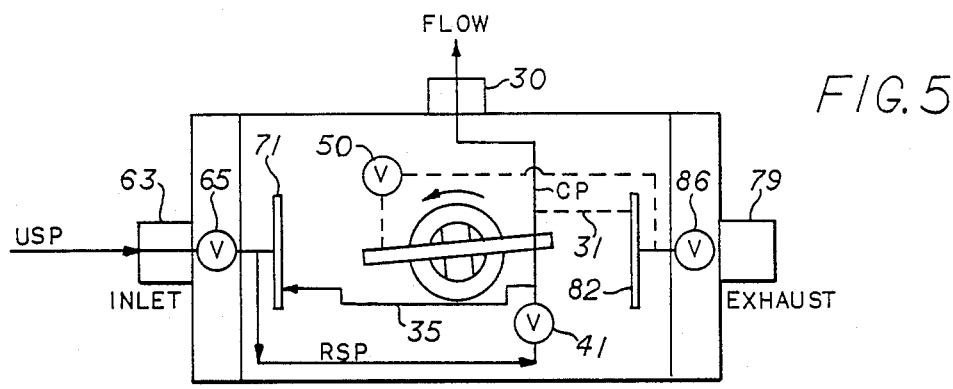
FIG. 5 is a schematic diagram illustrating the electrically operated fluid control valve being used to control down-stream pressure of an unregulated supply pressure.
Figure 6:
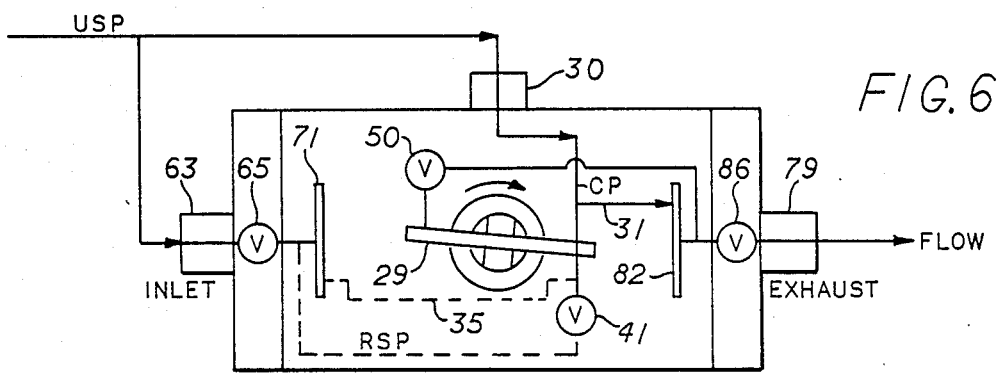
FIG. 6 is a schematic diagram illustrating the electrically operated fluid control valve being used to control up-stream pressure of fluid.
Figure 7:
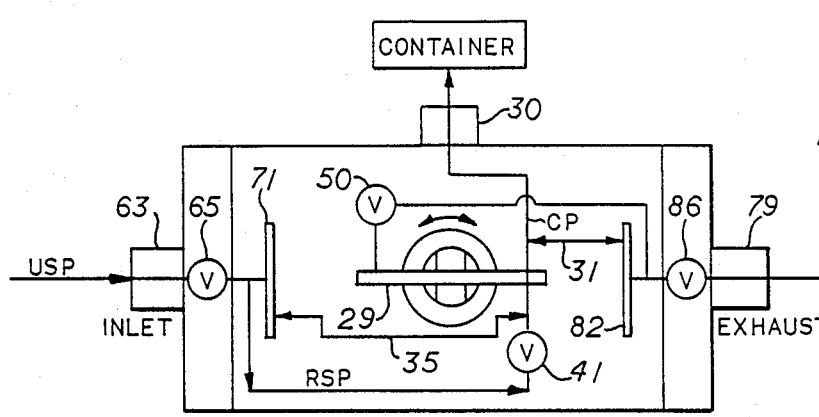
FIG. 7 is a schematic diagram illustrating the electrically operated fluid control valve being used as a three-way valve to flow fluid in and out of a closed container.
Figure 8:
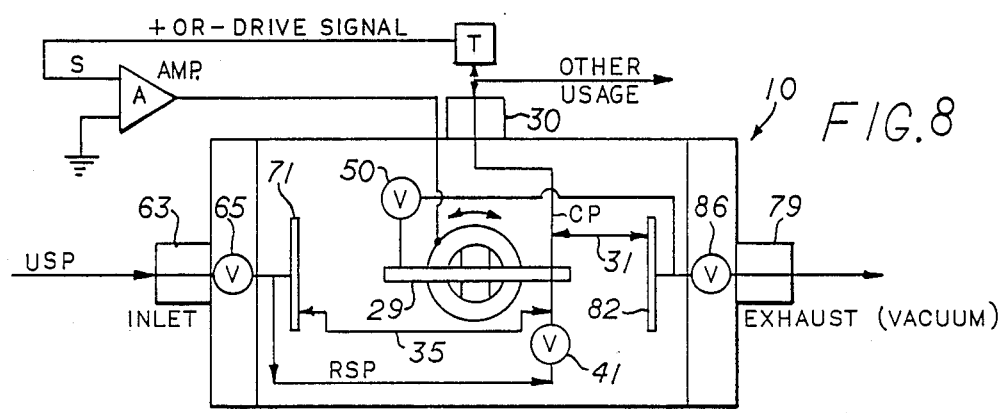
FIG. 8 is a schematic diagram illustrating the electrically operated fluid control valve used in a closed loop servo control system and coupled to a pressure transducer to set and maintain a precise fluid pressure.

It should be noted in following discussion that control pressure port 30 may be connected in various ways, for example; in FIG. 5 it serves as an outlet for the control pressure, in FIG. 6 it serves as an inlet for upstream pressure, in FIG. 7 it is connected to a closed container and serves as an inlet and outlet, and in FIG. 8, it is connected to a pressure transducer and the connecting line may also be tapped for supplying regulated pressure for other uses.

As shown in FIG. 5, to control down-stream pressure flow of fluid, an unregulated supply pressure USP is connected to the inlet port 63. The unregulated supply pressure USP passes through inlet supply valve 65 against supply diaphragm 71 and becomes a regulated supply pressure RSP. Proper polarity voltage to electrical connector 25 applies current to rotate control arm 29 counter-clockwise (as seen in FIG. 4) to pull open inlet control/relief valve 41 proportional to the applied current, thus providing metered flow of regulated supply pressure RSP through passageways 37, 37a, into the control chamber area 17 as control pressure CP, and through passageway 31 to control pressure port 30. The control pressure CP applied to the supply diaphragm 71 through passageway 35 is a reference pressure to regulate supply pressure RSP, thus maintaining a differential pressure through inlet control/relief valve 41. In utilizing the control valve 10 in the control of down-stream pressure, outlet control/relief valve 50, spring 56, exhaust diaphragm 82, exhaust valve 86, spring 83, and exhaust housing 13 are not functional. These components may be removed and replaced with a seal plate to reduce costs.

As shown in FIG. 6, to control up-stream pressure flow of fluid, the up-stream pressure is connected to inlet port 63 and control pressure port 30, thus up-stream supply pressure USP is applied to the inward side of exhaust diaphragm 82. Proper polarity voltage to electrical connector 25 applies current to rotate control arm 29 clockwise to push open the outlet control/relief valve 50 proportional to the applied current, thus the flow of up-stream pressure is metered through outlet control/relief valve 50, passing through exhaust valve 86 to exhaust port 79.

Up-stream pressure CP acting on the exhaust diaphragm 82 is a reference pressure which in turn varies the setting of exhaust valve 86, thus maintaining a differential pressure through outlet control/relief valve 50. In utilizing the control valve 10 in the control of up-stream pressure, supply housing 12, supply valve 65, spring 36, supply diaphragm 71, inlet control/relief valve 41, and spring 47 are not functional. These components may be removed and replaced with a seal plate to reduce costs in which case the up stream pressure CP is then connected only to control pressure port 30.

As shown in FIG. 7, the electrically operated control valve 10 may also be used as a three-way valve to flow fluid in and out of a closed container. Control pressure port 30 is connected to a closed container. Voltage is connected to electrical connector 25. Proper polarity will apply current to rotate control arm 29 counter-clockwise to pull open inlet control/relief valve 41. The flow rate into control pressure CP is proportional to the applied current, with maximum current allowing full flow to fill the closed container.

As control pressure CP increases and is supplied as a reference pressure through passageway 35 to supply diaphragm 71, the control pressure CP is also supplied to the exhaust diaphragm 82 to close exhaust valve 86. At slightly higher control pressure CP, the outlet control/relief valve 50 becomes a differential relief valve to bleed control pressure CP through passageways 38, 38a to regulated exhaust RE, thus maintaining a low differential across the exhaust diaphragm 82.

To decrease control pressure CP, polarity to electrical connector 25 is reversed to rotate control arm 29 clockwise to push open outlet control/relief valve 50 for flow through passageways 38, 38a to regulated exhaust RE, thus opening exhaust valve 86 with the exhaust rate proportional to applied current. As control pressure CP is decreased, the inlet control/relief valve 41 becomes a differential relief valve to bleed regulated supply pressure RSP to control pressure CP, thus maintaining a low differential across the supply diaphragm 71.

As shown in FIG. 8, the electrically operated control valve 10 may also be used in a closed loop servo control to set and maintain a precise fluid pressure when coupled with a pressure transducer. Control pressure CP through control pressure port 30 is connected to a pressure transducer T. The control pressure CP may be absolute pressure (total pressure), vacuum pressure (reduced below atmospheric pressure), gauge pressure (increased above atmospheric pressure), or a differential pressure (pressure higher or lower than a reference pressure).

The pressure transducer T detects the control pressure CP and supplies a command signal S, such as an error signal if the control pressure CP is not at the command pressure. An unregulated supply pressure USP is connected to inlet supply port 63. Required unregulated supply pressure USP is 10% to 30% higher than maximum control pressure CP. If control pressure CP is to be less than atmospheric pressure, a vacuum line is connected to the exhaust port 79.

Control pressure CP may be in any units of pressure, such as; pounds per square inch, inches of mercury, pascals, rates of flow, etc., as commanded from the pressure transducer T. When the pressure transducer T commands a higher pressure than the control pressure CP, an error signal S is produced by the pressure transducer T and supplied to a power amplifier A to drive the torque motor control arm 29 counter-clockwise to pull open inlet control/relief valve 41. Control pressure CP increase is supplied to the pressure transducer T to decrease the error signal S to zero and move the control arm 29 to neutral position.

When the pressure transducer T commands a lower pressure than the control pressure CP, a reversed polarity error signal S is produced by the pressure transducer T and supplied to a power amplifier A to drive the torque motor control arm 29 clockwise to push open outlet control/relief valve 50. Control pressure CP decrease is supplied to the pressure transducer T to decrease the error signal S to zero and move the control arm 29 to the neutral position.

When pressure is increased by opening inlet control/relief valve 41, the outlet control/relief valve 50 becomes a differential relief valve bleeding control pressure CP through passageways 38, 38a to regulated exhaust RE to maintain a low differential pressure across exhaust diaphragm 82. When pressure is decreased by opening outlet control/relief valve 50, the inlet control/relief valve 41 becomes a differential relief valve bleeding regulated supply pressure RSP through passageways 37, 37a to maintain a low differential pressure across supply diaphragm 71.

The synchronized operation of the control/relief valves protect the diaphragms from excess differential pressure and prevent surges of control pressure CP when pressure is increased, decreased or reversed.

While this invention has been described fully and completely with special emphasis upon a preferred embodiment, it should be understood that within the scope of the appended claims the invention may be practiced otherwise than as specifically described herein.

I claim:

1. A signal responsive fluid pressure control system for providing a controllable output pressure proportional to an electrical control signal comprising;
   a valve housing having a pressure control chamber, a torque motor mounted in said housing for connection to an electrical source providing voltage to the motor and having an output shaft projecting into said control chamber, a control arm secured on said output shaft to be rotated thereby and having opposed ends extending laterally to each side of said shaft within said control chamber, inlet means connected to an unregulated fluid pressure source and having a passageway extending into said chamber, an outlet port having a passageway connected with said chamber for conducting controlled output pressure therefrom, a first adjustable regulating means adjacent said inlet means for selectively regulating the fluid pressure supplied to the chamber through the inlet passageway, a passageway leading from said chamber to said first adjustable regulating means remote from said inlet means passageway for communicating fluid pressure between said chamber and said first regulating means, manually adjustable inlet control/relief valve means in said inlet passageway movably connected to one end of said control arm, whereby selected voltage applied to said torque motor will rotate said control arm to open said adjustable inlet control/relief valve means proportional to the applied current and said adjustable inlet control/relief valve means providing metered flow of the regulated supply pressure through the inlet passageway of the control chamber and to said outlet port as a controlled fluid pressure, and the controlled fluid pressure communicated through said remote passageway to said first regulating means becoming a reference pressure to regulate the fluid pressure supplied to the chamber through the inlet passageway, thus maintaining a differential pressure through said adjustable inlet control/relief valve means to provide a controlled output pressure through said outlet port.

2. A signal responsive fluid pressure control system for providing a controllable output pressure proportional to an electrical control signal comprising;

a valve housing having a pressure control chamber;

a torque motor mounted in said housing for connection to an electrical source providing voltage to the motor and having an output shaft projecting into said control chamber, a control arm secured on said output shaft to be rotated thereby and having opposed ends extending laterally to each side of said shaft within said control chamber, inlet means connected to an unregulated fluid pressure source and having a passageway extending into said chamber, second inlet means connected to the same unregulated pressure source and having a passageway extending into said chamber, an exhaust port for exhausting a controlled fluid pressure from said housing, adjustable regulating means between said chamber and said exhaust port for selectively regulating the fluid pressure supplied to the exhaust port through the exhaust passageway, an outlet passageway leading from said chamber to said adjustable regulating means remote from said inlet means passageway for communicating fluid pressure between said chamber and said regulating means and said exhaust port, manualy adjustable outlet control/relief valve means in said outlet passageway movably connected to one end of said control arm, whereby selected voltage applied to said torque motor will rotate said control arm to open said adjustable outlet control/relief valve means proportional to the applied current and said adjustable outlet control/relief valve means providing metered flow of the fluid supply pressure between the control chamber and said exhaust port as a controlled fluid pressure, and the controlled fluid pressure communicated through said outlet passageway to said regulating means becoming a reference pressure to regulate the fluid pressure supplied to the chamber through the inlet passageway, thus maintaining a differential pressure through said adjustable outlet control/relief valve means to provide a controlled output pressure through said exhaust port.

3. A signal responsive fluid pressure control system according to claim 1 including;

an exhaust port for exhausting a controlled fluid pressure from said housing, second adjustable regulating means between said chamber and said exhaust port for selectively regulating the fluid pressure supplied to the exhaust port through the exhaust passageway, an outlet passageway leading from said chamber to said adjustable regulating means remote from said inlet means passageway for communicating fluid pressure between said chamber and said regulating means and said exhaust port, manually adjustable outlet control/relief valve means in said outlet passageway movably connected to the other end of said control arm, whereby selected voltage applied to said torque motor will rotate said control arm in one direction to open said adjustable inlet control/relief valve means proportional to the applied current and said adjustable inlet control/relief valve means providing metered flow of the regulated supply pressure through the inlet passageway into the control chamber and to said outlet port as a controlled fluid pressure, and as the controlled fluid pressure increases and is communicated through said remote passageway to said first regulating means becomes a reference pressure to regulate the fluid pressure supplied to the chamber through the inlet passageway, thus maintaining a differential pressure through said adjustable inlet control/relief valve means to provide a controlled output pressure through said outlet port, and the controlled pressure in said chamber also being supplied to said second regulating means to close said exhaust port at a pre-selected pressure whereupon said adjustable outlet control/relief valve means acts as a differential relief valve to bleed excess controlled pressure through said outlet passageway to said exhaust port as regulated exhaust and thus maintaining a low differential pressure across said second regulating means, and whereby selected voltage of the reverse polarity applied to said torque motor will rotate said control arm in the reverse direction to open said adjustable outlet control/relief valve means proportional to the applied current and said adjustable outlet control/relief valve means providing metered flow of pressure from the control chamber through the outlet passageway to said second regulating means and to said exhaust port as regulated exhaust at a rate proportional to the applied current, and as the controlled fluid pressure decreases said adjustable inlet control/relief valve means acts as a differential relief valve to bleed excess supply pressure into said chamber through said adjustable outlet control/relief valve means through said outlet passageway to said exhaust port as regulated exhaust and thus maintaining a low differential pressure across said first regulating means.

4. A signal responsive fluid pressure control system according to claim 3 including;

a pressure transducer means connected to said outlet port for detecting the controlled pressure within said control chamber and supplying a signal upon detection of pressure therein different than a pre-selected command pressure, power amplifier means coupled to said transducer means and said torque motor, upon detecting a controlled pressure less than the pre-selected command pressure, said transducer means supplying a signal to said amplifier means to drive said torque motor control arm in one direction to open said adjustable inlet control/relief valve means to increase the controlled pressure within the control chamber sufficient to decrease the signal to zero and rotate said control arm to a neutral position thus closing said adjustable inlet control/relief valve means, and upon detecting a controlled pressure greater than the pre-selected command pressure, said transducer means supplying a signal to said amplifier means to drive said torque motor control arm in the reverse direction to open said adjustable outlet control/relief valve means to decrease the controlled pressure within the control chamber sufficient to decrease the signal to zero and rotate said control arm to a neutral position thus closing said adjustable outlet control/relief valve means, whereby when pressure within said chamber is increased by opening said adjustable inlet control/relief valve means, said adjustable outlet control/relief valve means acting as a differential relief valve to bleed controlled pressure from said chamber through said outlet passageway to become regulated exhaust to maintain a low differential pressure across said second regulating means, and when pressure within said chamber is decreased by opening said adjustable outlet control/relief valve means, said adjustable inlet control/relief valve means acting as a differential relief valve to bleed regulated supply pressure through said inlet passageway to maintain a low differential pressure across said first regulating means.

5. An electrically operated fluid control valve for providing a controllable output pressure proportional to an electrical control signal comprising;

a valve housing having a pressure control chamber, a torque motor mounted in said housing for connection to an electrical source providing voltage to the motor and having an output shaft projecting into said control chamber, a control arm secured on said output shaft to be rotated thereby and having opposed ends extending laterally to each side of said shaft within said control chamber, inlet means connected to an unregulated fluid pressure source and having a passageway extending into said chamber, an outlet port having a passageway connected with said chamber for conducting controlled output pressure therefrom, a first adjustable regulating means adjacent said inlet means for selectively regulating the fluid pressure supplied to the chamber through the inlet passageway, a passageway leading from said chamber to said first adjustable regulating means remote from said inlet means passageway for communicating fluid pressure between said chamber and said first regulating means, manually adjustable inlet control/relief valve means in said inlet passageway movably connected to one end of said control arm for adjustably controlling the flow of the regulated supply fluid pressure between said inlet passageway and said control chamber, whereby selected voltage applied to said torque motor will rotate said control arm to open said adjustable inlet control/relief valve means proportional to the applied current and said adjustable inlet control/relief valve means providing metered flow of the regulated supply pressure through the inlet passageway into the control chamber and to said outlet port as a controlled fluid pressure, and the controlled fluid pressure communicated through said remote passageway to said first regulating means becoming a reference pressure to regulate the fluid pressure supplied to the chamber through the inlet passageway, thus maintaining a differential pressure through said adjustable inlet control/relief valve means to provide a controlled output pressure through said outlet port.

6. An electrically operated fluid control valve for providing a controllable output pressure proportional to an electrical control signal comprising;

a valve housing having a pressure control chamber, a torque motor mounted in said housing for connection to an electrical source providing voltage to the motor and having an output shaft projecting into said control chamber, a control arm secured on said output shaft to be rotated thereby and having opposed ends extending laterally to each side of said shaft within said control chamber, inlet means connected to an unregulated fluid pressure source and having a passageway extending into said chamber, second inlet means connected to the same unregulated pressure source and having a passageway extending into said chamber, an exhaust port for exhausting a controlled fluid pressure from said housing, adjustable regulating means between said chamber and said exhaust port for selectively regulating the fluid pressure supplied to the exhaust port through the exhaust passageway, an outlet passageway leading from said chamber to said adjustable regulating means remote from said inlet means passageway for communicating fluid pressure between said chamber and said regulating means and said exhaust port, manually adjustable outlet control/relief valve means in said outlet passageway movably connected to one end of said control arm for adjustably controlling the flow of the regulated supply fluid pressure between said outlet passageway and said control chamber, whereby selected voltage applied to said torque motor will rotate said control arm to open said adjustable outlet control/relief valve means proportional to the applied current and said adjustable outlet control/relief valve means providing metered flow of the regulated supply pressure from the control chamber and to said exhaust port as a controlled fluid pressure, and the controlled fluid pressure communicated through said outlet passageway to said regulating means becoming a reference pressure to regulate the fluid pressure supplied to the chamber through the inlet passageway, thus maintaining a differential pressure through said adjustable outlet control/relief valve means to provide a controlled output pressure through said exhaust port.

7. An electrically operated fluid control valve according to according to claim 5 including;

an exhaust port for exhausting a controlled fluid pressure from said housing, second adjustable regulating means between said chamber and said exhaust port for selectively regulating the fluid pressure supplied to the exhaust port through the exhaust passageway.

an outlet passageway leading from said chamber to said adjustable regulating means remote from said inlet means passageway for communicating fluid pressure between said chamber and said regulating means of said exhaust port, manually adjustable outlet control/relief valve means in said outlet passageway movably connected to the other end of said control arm, whereby selected voltage applied to said torque motor will rotate said control arm in one direction to open said adjustable inlet control/relief valve means proportional to the applied current and said adjustable inlet control/relief valve means providing metered flow of the regulated supply pressure through the inlet passageway into the control chamber and to said outlet port as a controlled fluid pressure, and as the controlled fluid pressure increases and is communicated through said remote passageway to said first regulating means becomes a reference pressure to regulate the fluid pressure supplied to the chamber through the inlet passageway, thus maintaining a differential pressure through said adjustable inlet control/relief valve means to provide a controlled output pressure through said outlet port, and the controlled pressure in said chamber also being supplied to said second regulating means to close said exhaust port at a pre-selected pressure whereupon said adjustable outlet control/relief valve means acts as a differential relief valve to bleed excess controlled pressure through said outlet passageway to said exhaust port as regulated exhaust and thus maintaining a low differential pressure across said second regulating means, and whereby selected voltage of the reverse polarity applied to said torque motor will rotate said control arm in the reverse direction to open said adjustable outlet control/relief valve means proportional to the applied current and said adjustable outlet control/relief valve means providing metered flow of the pressure from the control chamber through the outlet passageway to said second regulating means and to said exhaust port as regulated exhaust at a rate proportional to the applied current, and as the controlled fluid pressure decreases said adjustable inlet control/relief valve means acts as a differential relief valve to bleed excess supply pressure into said chamber through said adjustable outlet control/relief valve means through said outlet passageway to said exhaust port as regulated exhaust and thus maintaining a low differential pressure across said first regulating means.

8. An electrically operated fluid control valve according to claim 7 including;

a pressure transducer means connected to said outlet port for detecting the controlled pressure within said control chamber and supplying a signal upon detection of pressure therein different than a pre-selected command pressure, power amplifier means coupled to said transducer means and said torque motor, upon detecting a controlled pressure less than the pre-selected command pressure, said transducer means supplying a signal to said amplifier means to drive said torque motor control arm in one direction to open said adjustable inlet control/relief valve means to increase the controlled pressure within the control chamber sufficient to decrease the signal to zero and rotate said control arm to a neutral position thus closing said adjustable inlet control/relief valve means, and upon detecting a controlled pressure greater than the pre-selected command pressure, said transducer means supplying a signal to said amplifier means to drive said torque motor control arm in the reverse direction to open said adjustable outlet control/relief valve means to decrease the controlled pressure within the control chamber sufficient to decrease the signal to zero and rotate said control arm to a neutral position thus closing said adjustable outlet control/relief valve means, whereby when pressure within said chamber is increased by opening said adjustable inlet control/relief valve means, said adjustable outlet control/relief valve means acting as a differential relief valve to bleed controlled pressure from said chamber through said outlet passageway to become regulated exhaust to maintain a low differential pressure across said second regulating means, and when pressure within said chamber is decreased by opening said adjustable outlet control/relief valve means, said adjustable inlet control/relief valve means acting as a differential relief valve to bleed regulated supply pressure through said inlet passageway to maintain a low differential pressure across first regulating means.

9. An electrically operated fluid control valve according to claim 7 which said valve housing comprises a generally rectangular control housing having a pressure control chamber therein, said torque motor mounted in said control housing coupled by leads to an electrical connector on said control housing exterior for providing voltage to the motor and having an output shaft projecting into said control chamber, and said control arm defined by a generally rectangular member secured on said torque motor output shaft to be rotated thereby and having opposed ends extending laterally to each side of said shaft within said pressure control chamber.

10. An electrically operated fluid control valve according to claim 7 in which
said valve housing comprises a generally rectangular control housing having a cavity at each end and one of said cavities forming said pressure control chamber at one end thereof,
an exhaust housing at one end of said control housing enclosing said pressure control chamber, and
a supply housing at the other end of said control housing enclosing the cavity at the other end,
said inlet means at one end of said control housing defined by an inlet port within said supply housing for connection to an unregulated fluid supply pressure, and
said inlet passageway leading from said inlet port through said supply housing and control housing to said pressure control chamber.

11. An electrically operated fluid control valve according to claim 10 in which
said inlet supply regulating means comprises;
a valve seat in said inlet port,
an inlet supply valve movably received in said valve,
a resilient diaphragm disposed between said supply housing and said control housing spaced from said inlet port and coupled with said inlet supply valve to move therewith,
spring retaining means in said control housing at the inlet end inwardly of said diaphragm, and
a compression spring compressed between the inward side of said diaphragm and said spring retaining means to urge said inlet supply valve off said valve seat to maintain said inlet port open against a predetermined fluid pressure.

12. An electrically operated fluid control valve according to claim 11 in which
said inlet supply valve comprises;
a small threaded shaft having an enlarged diameter portion at one end disposed within said inlet port and the other end extending through said valve seat toward said pressure control chamber and a nut installed near the extended end,
seal means beneath the enlarged diameter to form a sealing relation with said valve seat,
the extended end of said small threaded shaft riding on the outward side of said diaphragm to be moved therewith, and
a small compression spring surrounding the extended end of said shaft and having one end registered on the nut and the other end engaging the undersurface of said valve seat to urge said seal means against the valve seat to close said inlet port,
said nut allowing the spring force to be selectively increased or decreased, and
said compression spring on the inward side of said diaphragm of greater force than said small compression spring to urge said seal means off said valve seat to maintain said inlet port open against the force of said small compression spring.

13. An electrically operated fluid control valve according to claim 10 in which
said exhaust regulating means comprises;
a valve seat in said exhaust port,
a resilient diaphragm disposed between said exhaust housing and said control housing enclosing the open end of said pressure control chamber and separating it from the exhaust port
an exhaust valve member fixed to the outward side of said diaphragm to move therewith,
a compression spring compressed between the outward side of said diaphragm and said valve seat to urge said exhaust valve off said valve seat to maintain said exhaust port open against a predetermined fluid pressure.

14. An electrically operated fluid control valve according to claim 13 in which
said exhaust valve member comprises;
a small extension on the outward side of said diaphragm facing said valve seat, and
seal means on the small extension for forming a sealing relation with said valve seat.

15. An electrically operated fluid control valve according to claim 7 in which
said manually adjustable inlet control/relief valve means comprises;
a valve seat installed in said inlet passageway adjacent one end of said control arm,
a control/relief valve member slidably received in said valve seat and movably connected to one end of said control arm for movement therewith to control the flow of fluid pressure between said inlet passageway and said pressure control chamber,
an adjustment screw adjustably mounted in a threaded fitting in said control housing and accessible from the housing exterior, and
a compression spring compressed between said valve member and the undersurface of said adjustment screw such that the spring force may be selectively increased or decreased allowing said control/relief valve member to open or close independently of said control arm upon exposure to fluid pressures exceeding a predetermined magnitude.

16. An electrically operated fluid control valve according to claim 15 in which
said adjustable inlet control/relief valve member comprises;
a small shaft received through one end of said control arm and having a bulbous protrusion near one end which rides on the top surface of said control arm and an enlarged diameter portion spaced therefrom and beneath said control arm,
seal means on the underside of the enlarged diameter portion for forming a sealing relation with said valve seat, and
said compression spring surrounding the upper end of said shaft and having one end registered on the bulbous protrusion and the other end engaging the undersurface of said adjustment screw.

17. An electrically operated fluid control valve according to claim 7 in which
said manually adjustable outlet control/relief valve means comprises;
a valve seat installed in said outlet passageway adjacent one end of said control arm,
a control/relief valve member slidably received in said valve seat and movably connected to one end of said control arm for movement therewith to control the flow of fluid pressure between pressure control chamber and said outlet passageway, an adjustment screw adjustably mounted in a threaded fitting in said control housing and accessible from the housing exterior, and a compression spring compressed between said valve member and the undersurface of said adjustment screw such that the spring force may be selectively increased or decreased allowing said control/relief valve member to open or close independently of said control arm upon exposure to fluid pressures exceeding a predetermined magnitude.

18. An electrically operated fluid control valve according to claim 17 in which said adjustable outlet control/relief valve member comprises;

a small shaft having an enlarged diameter portion intermediate its ends and the bottom end riding on the top surface of one end of said control arm, seal means on the underside of said enlarged diameter portion for forming a sealing relation with said valve seat, and said compression spring surrounding the upper end of said shaft and having one end registered on the top of the enlarged diameter portion and the other end engaging the undersurface of said adjustment screw.

* * * * *